United States Patent
Toeroe et al.

(10) Patent No.: US 11,711,273 B2
(45) Date of Patent: Jul. 25, 2023

(54) TOWARDS NETWORK SLICE AVAILABILITY

(71) Applicants: Maria Toeroe, Montreal (CA); Siamak Azadiabad, Montreal (CA)

(72) Inventors: Maria Toeroe, Montreal (CA); Siamak Azadiabad, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

(21) Appl. No.: 17/266,203

(22) PCT Filed: Jul. 24, 2019

(86) PCT No.: PCT/IB2019/056343
§ 371 (c)(1),
(2) Date: Feb. 5, 2021

(87) PCT Pub. No.: WO2020/031012
PCT Pub. Date: Feb. 13, 2020

(65) Prior Publication Data
US 2021/0266235 A1    Aug. 26, 2021

Related U.S. Application Data

(60) Provisional application No. 62/715,913, filed on Aug. 8, 2018.

(51) Int. Cl.
*H04L 41/5009* (2022.01)
*H04L 12/46* (2006.01)

(52) U.S. Cl.
CPC ...... *H04L 41/5012* (2013.01); *H04L 12/4641* (2013.01)

(58) Field of Classification Search
None
See application file for complete search history.

(56) References Cited

U.S. PATENT DOCUMENTS 10,972,365 B2 * 4/2021 Ni .................. H04L 41/5012
2017/0134483 A1 * 5/2017 Miller ............... H04L 67/1031
(Continued)

OTHER PUBLICATIONS

ETSI GS NFV-REL 003 V.1 1.2: "Network Functions Virtualisation (NFV); Reliability; Report on Models and Features for End-to-End Reliability"; Jul. 2016; 106 pages.
(Continued)

*Primary Examiner* — Joshua Joo
(74) *Attorney, Agent, or Firm* — Julie Dufort; Ericsson Canada Inc.

(57) ABSTRACT

A method and system for providing a NS instance satisfying a requested availability of a NSI comprises obtaining at least one VNFD for a VNF composing the NS, the VNFD being associated with at least one absolute availability value guaranteed according to at least one DF; obtaining an availability value of NFVI on which the VNF is to be deployed; determining a minimum availability value for a NS instance of the NS; selecting a VNF DF and RM for the VNF DF such that the product of the absolute availability value of the VNF DF, taking into account the selected RM, and of the availability value of the NFVI is greater than or equal to the minimum availability value for the NS instance; and instantiating the NS instance by instantiating at least one VNF instance according to the at least one selected VNF DF and corresponding RM.

26 Claims, 8 Drawing Sheets

(56) References Cited

U.S. PATENT DOCUMENTS

| | | | | |
|---|---|---|---|---|
| 2017/0315844 A1* | 11/2017 | Ji | ............................ | H04L 65/00 |
| 2018/0062945 A1* | 3/2018 | Ni | ........................ | H04L 41/5045 |
| 2018/0145889 A1* | 5/2018 | Xu | ......................... | G06F 9/4856 |
| 2018/0324261 A1* | 11/2018 | Yi | ............................ | H04L 67/51 |
| 2018/0375726 A1* | 12/2018 | Xia | .......................... | H04L 43/20 |
| 2019/0334777 A1* | 10/2019 | Chou | ................... | H04L 41/0896 |
| 2020/0145302 A1* | 5/2020 | Ni | ........................ | H04L 41/5045 |
| 2020/0409743 A1* | 12/2020 | Ni | .......................... | G06F 9/5077 |
| 2021/0288827 A1* | 9/2021 | Celozzi | ................. | H04M 15/00 |
| 2022/0019469 A1* | 1/2022 | Ji | .......................... | G06F 9/5005 |

OTHER PUBLICATIONS

Network Functions Virtualisation (NFV); "Network Operator Persepctives on NFV priorities for 5G"; Feb. 21, 2017; 15 pages.

P.C Rangarajan et al.: "Managing the Availability of VNFs with the Availability Management Framework"; 2017; 4 pages.

REL010 5.2 Designing Network Slice with Certain Availability; Nov. 5, 2018; 9 pages.

Service Availability and Deployment Flavours, NFV REL 14; Juniper Networks; Jan. 10, 2014; 4 pages.

* cited by examiner

TOWARDS NETWORK SLICE AVAILABILITY

PRIORITY STATEMENT UNDER 35 U.S.C. S.119(E) & 37 C.F.R. S.1.78

This non-provisional patent application claims priority based upon the prior U.S. provisional patent application entitled "Towards network slice availability", application No. 62/715,913, filed Aug. 8, 2018, in the name of Toeroe.

TECHNICAL FIELD

The present disclosure relates to Network Function Virtualisation (NFV) and Network Slicing.

BACKGROUND

Network Slicing is a new paradigm of telecommunications networks virtualization. A Network Slice is an end-to-end virtualized network, which provides communication services according to a set of potentially stringent quality of service parameters such as latency and availability. It may be deployed on top of network services as defined by the ETSI-NFV specifications. Namely a network slice instance can be deployed as a composition of nested and concatenated network service instances.

SUMMARY

There is provided a method for providing a network service (NS) instance satisfying a requested availability of a network slice instance (NSI), comprising: obtaining at least one virtual network function (VNF) descriptor (VNFD) comprising at least one absolute availability value guaranteed according to at least one deployment flavor (DF) for the NS instance; obtaining an availability value of a network function virtualization infrastructure (NFVI); obtaining criteria for selecting at least one VNF and obtaining a redundancy model, based on the at least one absolute availability value of the at least one VNF descriptor and the availability value of the NFVI; selecting the at least one VNF for providing the NS instance based on the criteria; and instantiating a NS including at least one VNF instance corresponding to the at least one selected VNF, according to the redundancy model, thereby providing the NS instance.

The NS instance may be a composition of a plurality of VNF instances.

An availability value of the NS instance may be calculated as a product of an availability value of the redundancy model and the availability value of the NFVI.

The availability value of the NS instance may be greater than the requested availability of the NSI.

The NSI may be a composition of a plurality of NS instances.

An availability value of the NSI may be calculated as a product of the availability values of the plurality of NS instances in the NSI.

The VNFD may comprise an absolute availability value for the DF, $A_{VNF-DF}$

The VNFD may comprise a plurality of DFs and, for each DF, an absolute availability value, $A_{VNF-DF}$ The VNFD may further comprise information concerning which DFs of the VNF are designed to be used for VNF level redundancy.

The VNFD may further comprise information concerning a redundancy capability for each DF of the VNF that is designed to be used for VNF redundancy.

The VNFD may further comprise information concerning communication needs of redundant VNF instances.

There is no need for VNF redundancy for a VNF DF if $$A_{VNF-DF} > \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

There is a need for VNF redundancy for a VNF DF if $$A_{VNF-DF} \leq \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

The M and N values for the redundancy model may be chosen to satisfy $$RM(A_{VNF-DF}) > \frac{A_{NSI}}{A_{NFVI}},$$

where N is the number of VNF instances, M is the number of redundant VNF instances, and where $RM(A_{VNF-DF})$ is the function calculating an availability value of the redundancy model used with the VNF DF based on the availability $A_{VNF-DF}$ of the VNF DF, $A_{NFVI}$ is the availability of the NFVI on which the VNF instance is to be deployed, and $A_{NSI}$ is the availability of the NSI.

There is provided a system for providing a network service (NS) instance satisfying a requested availability of a network slice instance (NSI) comprising processing circuits and a memory, the memory containing instructions executable by the processing circuits whereby the system is operative to execute any of the steps of the previous method.

There is provided a non-transitory computer readable media having stored thereon instructions for providing a network service (NS) instance satisfying a requested availability of a network slice instance (NSI), the instructions comprising any of the steps of the previous method.

The method(s) and system(s) provided herein present improvements to the way prior NFV systems operate.

DETAILED DESCRIPTION

Various features and functions will now be described with reference to the figures to fully convey the scope of the disclosure to those skilled in the art.

Many aspects will be described in terms of sequences of actions or functions. It should be recognized that some functions or actions could be performed by specialized circuits, by program instructions being executed by one or more processors, or by a combination of both.

Further, some functions can be partially or completely embodied in the form of computer readable carrier or carrier wave containing an appropriate set of computer instructions that would cause a processor to carry out the techniques described herein.

Some functions/actions may occur out of the order noted in the sequence of actions or simultaneously. Furthermore, in some illustrations, some blocks, functions or actions may be optional and may or may not be executed; these are generally illustrated with dashed lines.

Within ETSI-NFV there is a discussion concerning how to ensure the availability of a network slice based on the availability characteristics of the composing network services and their composing elements. Current techniques are based on categorization, which is not sufficient.

The method and system provided herein are based on the perspective that a network slice instance (NSI) is a composition of network service (NS) instances. These NS instances recursively can be decomposed into a concatenation of Virtual Network Functions (VNFs), which may be deployed redundantly.

Composition/concatenation of non-redundant instances means that the total availability is calculated as the product of the availability of individual instances. Since the availability values are less than one, using a scale of zero to one, the multiplication implies that each individual availability needs to be greater than the requested total.

Assuming that the VNFs used to build the NS provide the absolute availability their deployment flavors guarantee and that a network provider knows the availability of its NFV infrastructure (NFVI), it is possible to provide the criteria for selecting the VNFs and their redundancy model.

This requires modifications to the current standards (specifically the VNF descriptor) to provide the absolute availability values and some additional characteristics.

Advantageously, with the method and system provided herein, the VNFs do not need to provide all their internal details to the network operators, yet the network operators can build network services appropriate for requested availability of network services and in turn network slices.

Designing Network Slice for Certain Availability

Overall Considerations

Since a network slice instance (NSI) is deployed in the NFV environment as a concatenation of one or more network service (NS) instances [see Network Functions Virtualisation (NFV)— Network Operator Perspectives on NFV priorities for 5G, Feb. 21$_{st}$, 2017, http://portal.etsi.oreNFV/NFV_White_Paper_5G.pdf] we can say that NSI availability depends on the availability of these NS instances, any of which may be a nested instance. Note that if two NS instances are redundant and backing up each other we can consider them as nested NS instance.

Accordingly, the NSI is available when all of the NS instances are available, which can be formulated as the product of the availability of the NS instances ($A_{NSi}$).

$$A_{NSI} = A_{NS1} * A_{NS2} * * A_{NSn} \quad (1)$$

Since typically an NS instance availability is less than 100% or $A_{NSi} < 1$, the multiplication in equation (1) implies that at minimum the availability of each NS instance needs to be greater than the target availability of the NSI, i.e. $\forall A_{NSi} > A_{NSI}$ Each of the NS instances themselves are compositions of VNF instances and nested NS instances. Unfolding the nested NS instances, the NS instance becomes a concatenation of VNFs, some or all of which might be deployed with redundant instances.

If the redundant instances of each given VNF as an NS are considered, it can be said that the availability of such an NS instance depends on the availability of the redundant VNF instances (each with the availability of $A_{VNF}$) and the availability of the NFVI ($A_{NFVI}$) on which they are deployed. Thus, NS instance availability ($A_{NS}$) is:

$$A_{NS} = A_{NFVI} * RM(A_{VNF}) \quad (2)$$

The NFVI availability can be considered as a whole, or as its different subsets or components hosting the different VNF instances.

The Redundancy Model (RM) function, equation (2), depends on the redundancy model used with the VNF instances, but in general $RM(A_{VNF}) \geq A_{VNF}$. That is, using some redundancy improves the availability of the individual VNF instances, i.e. RM $(A_{VNF}) > A_{VNF}$, while using no redundancy $RM(A_{VNF}) = A_{VNF}$ Considering (1) and (2), to achieve a given availability for a network slice instance ($A_{NSI}$), it is clear that since $\forall A_{NSi} > A_{NSI}$ the conditions of $A_{NFVIi} > A_{NSi} > A_{NSI}$ and $RM(A_{VNFi}) > A_{NSi} > A_{NSI}$ need to be fulfilled. This means that the availability of all NSs composing the network slice instance has to be greater than the targeted availability for the network slice instance. Further, $A_{NFVI}$ indicates the availability of the NFVI on which the ith NS is built and $A_{VNFi}$ is the availability of the VNF composing it.

In table 1 three different configurations were proposed to achieve different resiliency levels represented by NS resiliency classes. Each row proposed a selection of NFVI components and redundancy models of the VNFs and Virtual Links (VLs) to achieve a given NS resiliency class. However, the above considerations suggest that this approach may not be satisfactory, and it is necessary to know the absolute availability value a VNF can provide.

TABLE 1

Examples of network service resiliency configuration

| Network service resiliency class | Storage resource reliability | Compute resource reliability | Network service VFNs redundancy | | | Link redundancy |
|---|---|---|---|---|---|---|
| | | | Level | Type | Technique | |
| High | High | High | VNF and VNFC | 1 + 1 | Local + Geo redundancy | Redundant dual-homed |
| Medium | Medium | Medium | VNF and VNFC | 1 + 1 | Local + Geo redundancy | Redundant single-homed |

TABLE 1-continued

Examples of network service resiliency configuration

| Network service resiliency class | Storage resource reliability | Compute resource reliability | Network service VFNs redundancy | | | Link redundancy |
|---|---|---|---|---|---|---|
| | | | Level | Type | Technique | |
| Low | Regular | Regular | VNFC | N + K | Local redundancy | Link aggregation |

With respect to table 1, let consider only two different resiliency classes and define resiliency class "high" with an availability of equal to or greater than 99.999% and "low" if the availability is below 99.999%. This means that if this classification is applied individually to the different NFVI resources represented in the columns and if the availability each of them is equal to 99.999% (or A=0.99999), then they are each considered of the category "high" as the first row of the table shows. If these different resources are used to compose an NS, then the availability of the resources needs to be multiplied to calculate the availability of the composed NS. Since all the composing resources have an availability A=0.99999 any multiplication will result in an availability lower than A=0.99999 (e.g. 0.99999 * 0.99999=0.9999800001), which, according to the definition, falls into the "low" category. The more such resources are required for the NS the more the overall availability falls below the availability expected by the "high" category.

Considering the redundancy models with respect to (2), they can improve the availability of the individual VNF instances.

Consideration of VNF-Internal Redundancy

The VNF is a black box with respect to its internal redundancy for the NFV-Management and Orchestration (MANO) (NFV-MANO). The NFV-MANO does not manage nor is aware of the redundancy applied to the VNF Component (VNFC) instances. Instead the NFV-MANO instantiate a VNF according to the Deployment Flavor (DF) selected and follows the instantiation levels and scaling policies associated with the DF.

The scaling policies and instantiation levels dictate the number of VNFC instances the NFV-MANO should instantiate for each VNFC. Since redundancy is reflected in the number of VNFC instances, it is safe to assume that scale levels of a DF of a VNF reflects the redundancy model used within the VNF for each VNFC. Note that different VNFCs may utilize different redundancy models within the same VNF and may be scaled differently. It is possible that a given VNFC is used with different redundancy models in different DFs of the same VNF and accordingly it may be scaled differently in different DFs. That is, the scaling policy associated with a DF takes into consideration both the performance and the redundancy requirements for each of the VNFCs used in the DF.

Therefore, it is better to know the absolute availability a VNF DF provides than the redundancy model(s) used by that DF for the VNFCs. In this respect however, it is expected that the different instantiation levels of a DF and its associated scaling policies are provided in the VNF Descriptor (VNFD) in such a way that the availability indicated for the DF is guaranteed at each instantiation level considering a 100% reliable NFVI i.e. $A_{NFVI}=1$. Thus, $A_{VNF-DF}$ is given according to (2) for the case when an instance of the VNF is deployed with the given DF under the ideal condition.

$$A_{NS}=1*A_{VNF-DF}$$

When this DF is deployed on a less than ideal NFVI, then without VNF-level redundancy the NS availability achievable can be calculated as:

$$A_{NS}=A_{NFVI}*A_{VNF-DF}$$

Or the VNF DF can be selected according to the target NS availability and the available NFVI availability as:

$$A_{VNF-DF} \geq \frac{A_{NS}}{A_{NFVI}} \quad (3)$$

Depending on the NFVI resources and VNFs at disposal, this availability may not be sufficient for the NS, in which case the VNF instances need to be deployed redundantly. Redundant deployment of VNF instances is always the case in geo-redundant configurations, i.e. when disaster recovery is a requirement.

Availability estimation for the 1+1 and 1:1 redundancy models

In the 1+1 and 1:1 redundancy models, each VNF instance has a redundant VNF instance as protection. The protecting VNF instance may also be active, in which case the two VNFs share the actual workload. The protecting VNF instance may alternatively be a standby for the first/active VNF instance.

The 1+1 redundancy model is the active-active redundancy model where both instances provide services as well as backing up each other. 1:1 indicates the active-standby redundancy (see FIG. 1) where one instance provides the service, the other does not, it only serves as a backup/standby for the first, in case it fails.

The document ETSI GS NFV-REL 003 V1.1.2 (2016-07) Network Functions Virtualisation (NFV); Reliability; Report on Models and Features for End-to-End Reliability https://docbox.etsi.org/ISG/NFV/Open/Publications_pdf/Specs-Reports/NFV-REL %20003v1.1.2%20-%20GS %20-%20E2E %20reliability %20models %20report.pdf provides further information concerning the redundancy models discussed herein.

In either case, the NFV-MANO does not manage the active/standby role assignments of the VNF instances nor is it aware of these roles.

The NFV-MANO is only responsible to provide virtualized resources of enough capacity that allow full protection for the entire workload handled by the VNF instance-pair so that there is no service degradation in case one of the instances fails. Hence, the availability estimation is the same for both redundancy models and reflects the availability with respect to the resources provided by the NFV system.

Figure 1:
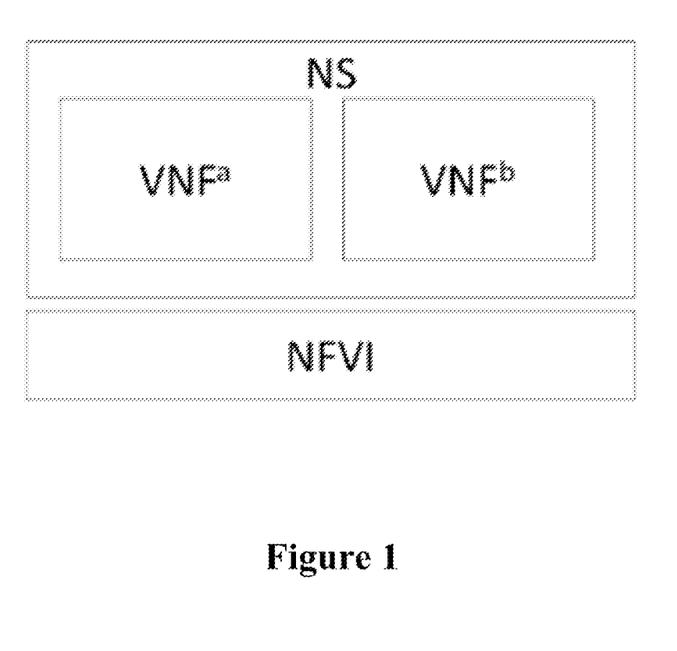
FIG. 1 is a schematic illustration of a 1:1 redundancy model.

FIG. 1 depicts an example of an instance of a simple Network Service (NS), which is composed of one VNF. In the NS instance, the VNF has an active ($VNF^a$) and a standby ($VNF^b$) instance. They are hosted on the same NFVI, but they form an anti-affinity group and therefore rely on different physical resources within the NFVI.

To calculate the overall availability in this case, it is assumed that the NS instance is available when the NFVI and at least one of the VNF instances are available. Therefore, the NS instance is not available if the NFVI or both VNF instances fail, and:

$$A_{NS}=A_{NFVI}*(1-(F_{VNF^a}*F_{VNF^b}))$$

where, $F_{VNF}=1-A_{VNF}$ $$A_{NS}=A_{NFVI}*(1-((1-A_{VNF^a})*(1-A_{VNF^b})))$$

If $VNF^a$ and $VNF^b$ are deployed using the same DF, which provides the same availability for all instantiation levels, then:

$$A_{VNF^a}=A_{VNF^b}$$

Therefore, the NS instance availability becomes:

$$A_{NS}=A_{NFVI}*(1-(1-A_{VNF^a})^2)$$

$$A_{NS}=A_{NFVI}*(1-(1+A_{VNF^a}^2-2*A_{VNF^a}))$$

Which can be re-written as:

$$A_{NS}=A_{NFVI}*(2*A_{VNF}A_{VNF}^2) \quad (4)$$

Equation (4) provides the RM function for the 1+1 and 1:1 redundancy models.

Availability Estimation for the N+M and N:M Redundancy Models

As in the previous case the NFV-MANO does not manage nor is aware of the active/standby roles of the VNF instances. It only manages the number of VNF instances based on the volume of the workload handled by the instances. Therefore, from the NFV-MANO perspective, these models indicate the number of VNF instances required to serve the workload without protection (N) and the number of VNF instance that can fail (M) before any workload degradation occurs; i.e. M instances provide protection for the workload capacity of N instances. Hence, from NFV perspective only resource level availability can be considered, i.e. any of the M redundant instances can replace any of the N instances.

Figure 2:
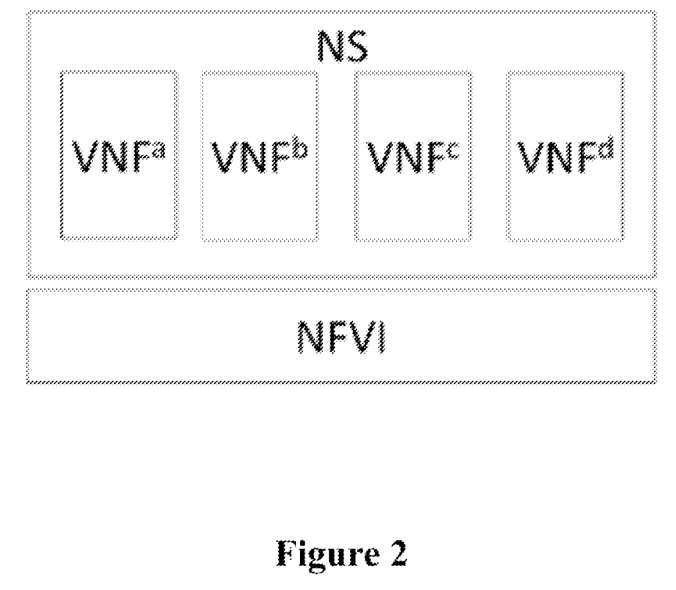
FIG. 2 is a schematic illustration of a 3:1 redundancy model.

It is assumed that we have an instance of a simple NS with one VNF, which has four instances as shown in FIG. 2. The VNF instances use the 3:1 redundancy model which means that, out of the four, three are active VNF instances (e.g. $VNF^a$, $VNF^b$ and $VNF^c$) and one is standby ($VNF^d$). All of these are deployed on the same NFVI, but form an anti-affinity group, which means they rely on different physical resources.

Since there is only one redundant VNF instance (M=1), if more than one (generally, more than M) VNF instance(s) fail(s), the overall availability goal is not met, i.e. the service becomes degraded or fails completely. To avoid this, the minimum number of VNF instances N must be available, which is three in this case. As a result, the availability of the NS instance would be: $A_{NS}=A_{NFVI}$ * (the probability of having at least three available VNF instances)

$$A_{NS} = A_{NFVI} * (A_{VNF^a} * A_{VNF^b} * A_{VNF^c} * F_{VNF^d} +$$
$$A_{VNF^a} * A_{VNF^b} * F_{VNF^c} * A_{VNF^d} + A_{VNF^a} * F_{VNF^b} * A_{VNF^c} * A_{VNF^d} +$$
$$F_{VNF^a} * A_{VNF^b} * A_{VNF^c} * A_{VNF^d} + A_{VNF^a} * A_{VNF^b} * A_{VNF^c} * A_{VNF^d})$$

Assuming that all the VNF instances are deployed with the same VNF DF, then:

$$A_{VNF^a}=A_{VNF^b}=A_{VNF^c}=A_{VNF^d}=A_{VNF}$$

Therefore, the availability of the NS instance is:

$$A_{NS}=A_{NFVI}*(4*F_{VNF}A_{VNF})$$

Accordingly, to keep the NS instance available, the NFVI has to be available and, in addition, a selection of three VNF instances out of the four, or a selection of four VNF instances out of the four must be available. This means that the above can be re-written as:

$$A_{NS}=A_{NFVI}*((_3^4)A_{VNF}^3*(1-A_{VNF})^1+(_4^4)*A_{VNF}^4*(1-A_{VNF})^0$$

This equation can be generalized as:

$$A_{NS} = A_{NFVI} * \left( \sum_{k=0}^{M} \binom{N+M}{N+k} A_{VNF}^{N+k} * (1-A_{VNF})^{M-k} \right) \text{ where } N>0 \, \& M \geq 0 \quad (5)$$

Equation (5) provides the RM function for the N+M and N:M redundancy models.

Availability Estimation for Single- and Dual-Homed Link Redundancy

The availability of an NS instance also depends on the availability of the virtual links (VLs) interconnecting the different VNF instances. For the estimation of the availability of the virtual links single- and dual-homing are considered.

Figure 3:
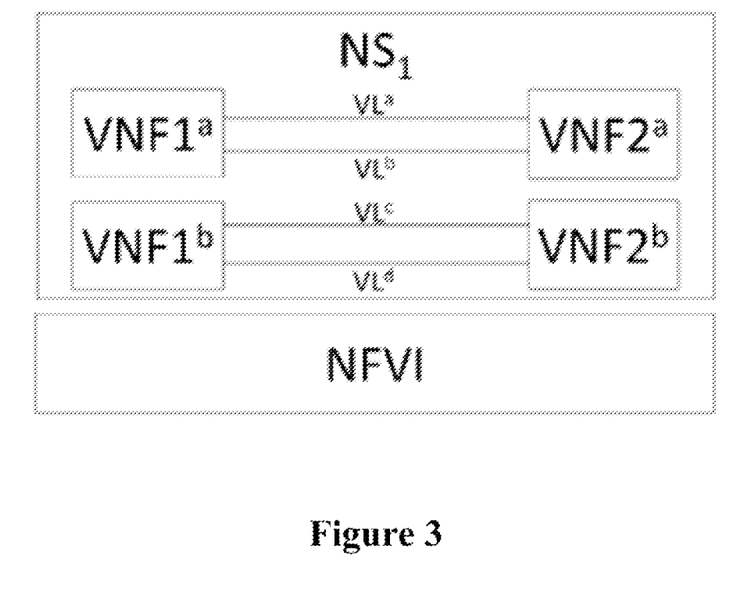
FIG. 3 is a schematic illustration of single-homed link redundancy.

To begin with, two simple cases of VL redundancy, in an NS with two VNFs, are considered:

$NS_1$ uses single-homing as redundancy for the VLs between the instances of VNF1 and VNF2, as shown in FIG. 3.

Figure 4:
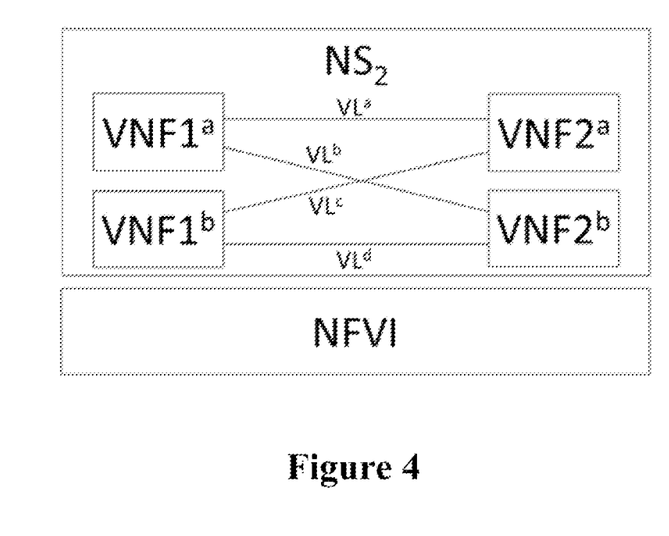
FIG. 4 is a schematic illustration of dual-homed link redundancy.

In contrast, $NS_2$ uses dual-homing as shown in FIG. 4.

The assumption is that the redundant VLs form anti-affinity groups and therefore rely on different physical resources.

To calculate the availability for these NS instances, it is assumed that:

$$A_{VNF1^a}=A_{VNF1^b} \text{ and } A_{VNF2^a}=A_{VNF2^b}$$

$$A_{VL^a}=A_{VL^b}=A_{VL^c}=A_{VL^b}=A_{VL}$$

Then, $NS_1$ is available if the NFVI is available and:
I. $VNF1^a$ and $VNF2^a$ and at least one of $VL^a$ and $VL^b$ is available; or
II. $VNF1^b$ and $VNF2^b$ and at least one of the $VL^c$ and $VL^d$ is available; or
III. Both above conditions are met.

Therefore:

$$A_I=A_{II}=A_{VNF1}*(1-F_{VL}^2)*A_{VNF2}$$

$$A_{NS_1}=A_{NFVI}*(1-F_I*F_{II})$$

$$A_{NS_1}=A_{NFVI}*(1-(1-A_{VNF1}*(1-*A_{VNF2})^2) \quad (6)$$

$NS_2$ is available if at least one of $VNFI^a$ and $VNFI^b$ is available and one of the $VNF2^a$ and $VNF2^b$ is available and at least one link between a couple of available VNFs is available. $A_I$ and $F_I$ indicate the availability and the failure (i.e. non-availability) for case I, and $A_{II}$ and $F_{II}$ indicate the same for case II.

As a result:

$$A_{NS_2} = A_{NFVI} * (4*A_{VNF1}*F_{VNF1}*A_{VNF2}*F_{VNF2}*A_{VL} + \quad (7)$$
$$2*A_{VNF1}*F_{VNF1}*A_{VNF2}^2*(1-F_{VL}^2)+$$
$$2*A_{VNF1}^2*A_{VNF2}*F_{VNF2}*(1-F_{VL}^2)+A_{VNF1}^2*A_{VNF2}^2*(1-F_{VL}^4))$$

Note that the same logic applies within the VNF with respect to the redundancy and availability of the links interconnecting VNFC instances.

Analysis of Service Resiliency Configuration Examples

After determining the RM($A_{VNF}$) function for different redundancy configurations the resiliency configurations of table 1 can be further analyzed. The question is whether different redundancy models of VNF instances and VLs could be used depending the availability provided by different VNFs or VNF DFs ($A_{VNF}$) and the NFVI ($A_{NFVI}$).

In fact, equations (2) and (3) propose that if a given value is desired for $A_{NS}$, a provider can select a NFVI with lower availability and provide the same NS availability by constructing an RM($A_{VNF}$) with higher availability. Alternatively, one can exploit a more reliable NFVI or redundancy to compensate for a lower $A_{VNF}$. This is demonstrated in the following examples based on (4), (5), (6), and (7), by deploying different VNFs (or different DFs of a VNF) to achieve a certain availability.

It is assumed that the minimum absolute availabilities a VNF can provide are reflected in the DFs of the VNF, each of which is defined according to some VNF-internal redundancy model known by the VNF vendor. That is, the different instantiation levels of a DF and its associated scaling policies are defined in such a way in the VNFD that all of them guarantee the availability indicated for the DF on a 100% reliable NFVI i.e. $A_{NFVI}$=1.

Example 1: VNF Availability Compensating for Weaker Redundancy Model

Assuming there is a need for an NS with four 9s availability ($A_{NS}$=0.9999). The availability of the NFVI is $A_{NFVI}$=0.99999.

The NS can be built in different ways, i.e. using VNFs from different vendors or using different DFs of the same VNF. Let assume DF1 of a VNF provides two 9s availability for a VNF instance, i.e. $A_{VNF1}$=0.99, and DF2 of the VNF provides three 9s availability for a VNF instance, i.e. $A_{VNF2}$=0.999. Since $A_{VNF1}$<$A_{VNF2}$ the $NS_1$ is composed with two redundant VNF instances using DF1 in the 1+1 redundancy model; while $NS_2$ is composed with three VNF instances of DF2 with the 2+1 redundancy model used for $NS_2$.

Using equation (4) for $NS_1$, the estimated availability is:

$A_{NS1}=A_{NFVI}*(2*A_{VNF1}A_{VNF1}^2)=0.999890001$

Using equation (5) for $NS_2$ its estimated availability is:

$$A_{NS_2} = A_{NFVI} * \left( \sum_{k=0}^{M} \binom{N+M}{N+k} A_{VNF2*}^{N+k} (1 - A_{VNF2})^{M-k} \right) = 0.99998700202998$$

Thus, despite the weaker redundancy model used in $NS_2$, it meets the expected four 9s availability due to the significantly higher availability that the DF2 provides. On the other hand, $NS_1$, even with the stronger redundancy model, cannot be used to meet the expectations.

This example demonstrates that depending on the availability of the VNF instances, it is possible to achieve better availability (e.g. four 9s versus three 9s) with a redundancy model typically considered to be weak (i.e. for lower availability in the third row of the table 1). Thus, the redundancy model by itself does not characterize the achievable availability. A VNF with a higher availability can compensate for the lower capability of the redundancy model. Moreover, using a stronger redundancy model with such a VNF results in lower utilization of resources.

The same logic applies within the VNF with respect to the redundancy and availability of the VNFC instances. This reinforce the point made earlier that characterizing the VNF by the redundancy model used for the VNFC instances is not sufficient to characterize the overall availability a VNF or its DF can provide.

Example 2: NFVI Availability Compensating for VNF Availability

Considering the NSs of the previous example and deploying them on an NFVI with six 9s availability ($A_{NFVI}$= 0.999999), if all other conditions remain the same, the calculations result in:

$A_{NS_1}$=0.9998990001>0.999890001

$A_{NS_2}$=0.999996002002998>0.99998700202998

Thus, the availability of the NSs increased in both cases, which indicates that the NFVI availability can compensate to some extent for the shortcomings of the VNF. In case of $NS_2$ deployed with the N+M redundancy model, such improvement of the NFVI availability results in achieving even five 9s availability. However, for NSi deployed with the 1+1 redundancy model it is still not enough to provide the targeted four 9s.

These results, together with the previous ones, show how the combination of the NFVI, the VNF availabilities and the redundancy model need to be considered.

Example 3: VNF Availability Compensating for VL Redundancy

To compare the NS availability when used with different VNFs and different VL redundancy models the cases shown in FIGS. 3 and 4 are considered.

Here, the NS is built from two interconnected VNFs: VNF1 and VNF2. Again, VNF instances with different DFs providing different availabilities are used and are interconnected through links with different redundancies. That is, $NS_1$ uses single-homing as redundancy for the VLs between the instances of VNF1 and VNF2, while $NS_2$ uses dual-homing. The following is further assumed:

For all cases $A_{VL}$=0.9999 and $A_{NFVI}$=0.99999
For $NS_1$ $A_{VNF1}$=$A_{VNF2}$=0.999
For $NS_2$, $A_{VNF1}$=$A_{VNF2}$=0.99

Then, using equations (6) and (7) respectively the availability of the NS instance is estimated as:

$A_{NS_1}$=0.9999860039990602294211962058960

$A_{NS_2}$=0.999789972408176225137359596010

This shows that NSi deployed with single-homing (the weaker link redundancy) but built with instances of higher availability can provide the targeted four 9s availability. On the other hand, $NS_2$, deployed with dual-homing, does not provide the expected four 9s due to the lower availability of the VNF instances used, i.e. the availability of the VNFs used in $NS_1$ compensates for the difference in the VL redundancy. This again shows that using a better link redundancy model by itself does not necessarily provide better availability. It needs to be considered together with the other composing elements of the NS and their redundancy.

Analysis and Conclusions

These examples demonstrate that, at the time of the NS design, it is necessary to know the absolute availability that can be provided by the different elements that can be used for composing an NS. With this information an appropriate combination can be selected and combined using appropriate redundancy models as necessary for the VNF and VL instances.

In case of the VNF, the information necessary includes the minimum absolute availability each DF indicated in the VNFD can provide. Each DF needs to be designed in such a way that this absolute availability is maintained throughout the different instantiation levels described for the DF when scaling according to the applicable scaling policies also described in the VNFD.

Since redundant deployment of a VNF is reflected in the NS Descriptor (NSD), the VNFD needs to include enough information based on which a provider can design an NS for a desired availability. The information necessary for this includes:

Indicating the DF(s) of the VNF, which are designed to be used for VNF level redundancy.

The redundancy capability of such DF(s) in terms of the N and M ratio of VNF instances that can be used together, if any.

The communication needs of the redundant VNF instances, if any.

Note that since the NFV-MANO does not manage and is not aware of the active/standby roles of the VNF instances, the N and M ratio only provides information in terms of redundant capacity of resources provided by the NFV system.

Considering (1) according to which $\forall A_{NSi} > A_{NSI}$ needs to be fulfilled, that is, the availability of any NS instance used for an NSI needs to provide an availability greater than the availability of the NSI. This means that the availability required by the NSI provides a lower bound of availability for the NS design.

Considering the availability of the NFVI, and the different VNF DFs, it can be determined whether VNF redundancy is necessary for each applicable VNF DF. If the following condition (8) is satisfied, no VNF redundancy is required from an availability perspective for the given VNF DF. $A_{NFVI}$ is the availability of the NFVI on which the VNF instance is to be deployed. $A_{NSI}$ is the availability of the NSI for which the VNF instance is considered.

$$A_{VNF-DF} > \frac{A_{NSI}}{A_{NFVI}} \quad (8)$$

If this is not the case, it may still be possible to use the VNF in a redundant configuration. For this, the considered VNF DF needs to support redundant configurations. If so, the N and M values can be used to determine if condition (9) can be satisfied.

$$RM(A_{VNF-DF}) > \frac{A_{NSI}}{A_{NFVI}} \quad (9)$$

Note that the multiplication in (1) means that satisfying (9) for each $NS_i$ composing the NSI does not mean that the overall NSI availability requirement is met, as it has been shown at the resiliency configuration. (8) and (9) are only the necessary conditions that provide the starting point for the design.

Requirements

It shall be possible to indicate in the VNFD the minimum absolute availability value provided by a deployment flavor of the VNF.

The minimum absolute availability value of a VNF deployment flavor shall be indicated as if the VNF was deployed on an NFVI with 100% availability.

Each instantiation level of a given VNF deployment flavor and the associated scaling policies shall guarantee the minimum absolute availability value specified for the deployment flavor.

It shall be possible to indicate whether a deployment flavor of the VNF is designed for redundant deployment of VNF instances and the applicable redundancy capability in terms of redundant capacity.

It shall be possible to indicate if redundant deployment of the VNF requires interconnection between the VNF instances and its characteristics.

Figure 5A:
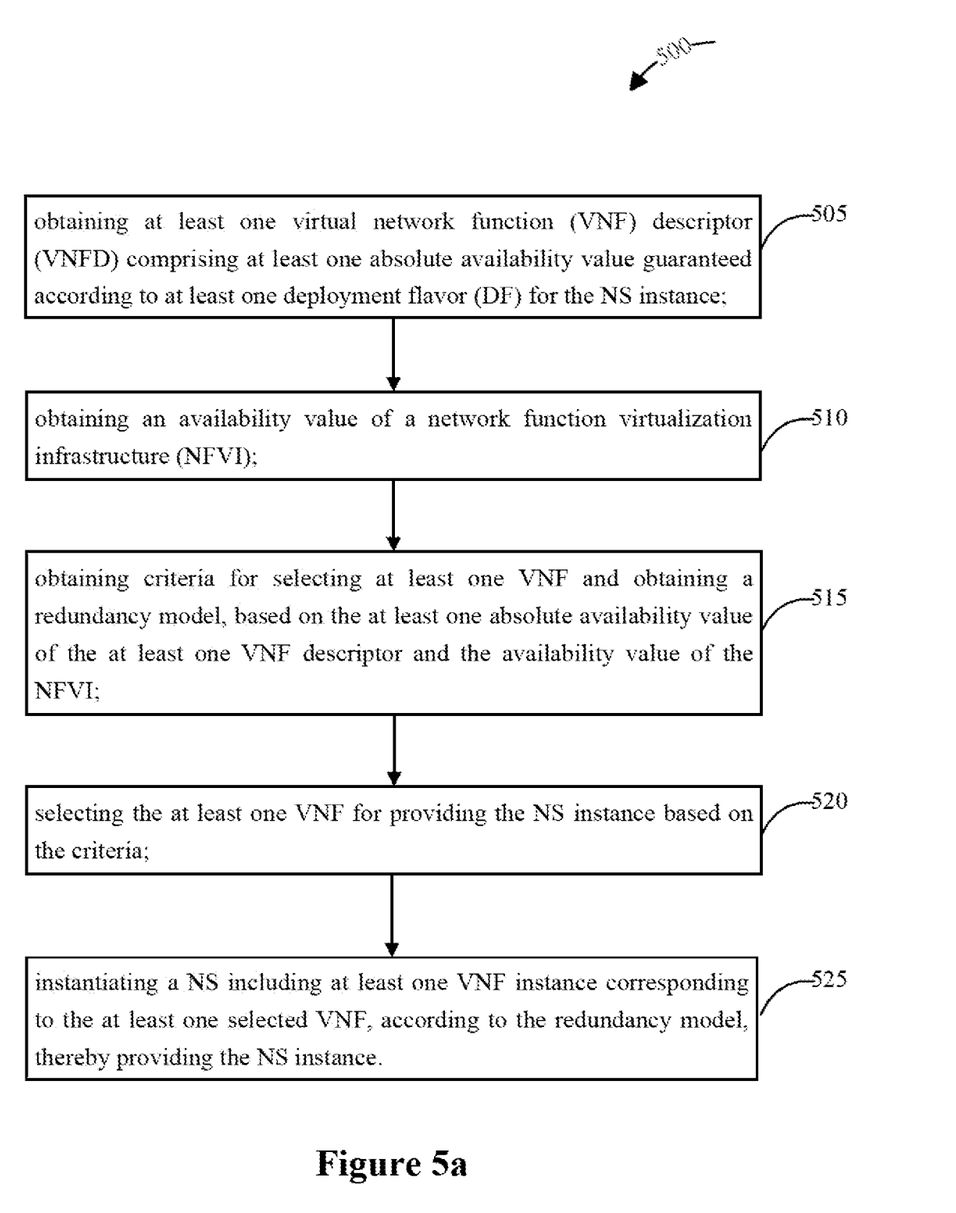
FIGS. 5a and 5b are flowcharts of methods for providing a network service (NS) instance satisfying a requested availability of a network slice instance (NSI).

Referring to FIG. 5a, there is provided a method 500 for providing a network service (NS) instance satisfying a requested availability of a network slice instance (NSI), comprising: obtaining, step 505, at least one virtual network function (VNF) descriptor (VNFD) comprising at least one absolute availability value guaranteed according to at least one deployment flavor (DF) for the NS instance; obtaining, step 510, an availability value of a network function virtualization infrastructure (NFVI); obtaining, step 515, criteria for selecting at least one VNF and obtaining a redundancy model, based on the at least one absolute availability value of the at least one VNF descriptor and the availability value of the NFVI; selecting, step 520, the at least one VNF for providing the NS instance based on the criteria; and instantiating, step 525, a NS including at least one VNF instance corresponding to the at least one selected VNF, according to the redundancy model, thereby providing the NS instance.

The NS instance may be a composition of a plurality of VNF instances.

An availability value of the NS instance may be calculated as a product of an availability value of the redundancy model and the availability value of the NFVI.

The availability value of the NS instance may be greater than the requested availability of the NSI.

The NSI may be a composition of a plurality of NS instances.

An availability value of the NSI may be calculated as a product of the availability values of the plurality of NS instances in the NSI.

The VNFD may comprise an absolute availability value for the DF, $A_{VNF-DF}$.

The VNFD may comprise a plurality of DFs and, for each DF, an absolute availability value, $A_{VNF-DF}$.

The VNFD may further comprise information concerning which DFs of the VNF are designed to be used for VNF level redundancy.

The VNFD may further comprise information concerning a redundancy capability for each DF of the VNF that is designed to be used for VNF redundancy.

The VNFD may further comprise information concerning communication needs of redundant VNF instances.

There is no need for VNF redundancy for a VNF DF if $$A_{VNF-DF} > \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

There is a need for VNF redundancy for a VNF DF if $$A_{VNF-DF} \leq \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

The M and N values for the redundancy model may be chosen to satisfy $$RM(A_{VNF-DF}) > \frac{A_{NSI}}{A_{NFVI}},$$

where N is me number of VNF instances, M is the number of redundant VNF instances, and where $RM(A_{VNF-DF})$ is the function calculating an availability value of the redundancy model used with the VNF DF based on the availability $A_{VNF-DF}$ of the VNF DF, $A_{NFVI}$ is the availability of the NFVI on which the VNF instance is to be deployed, and $A_{NSI}$ is the availability of the NSI.

Figure 5B:
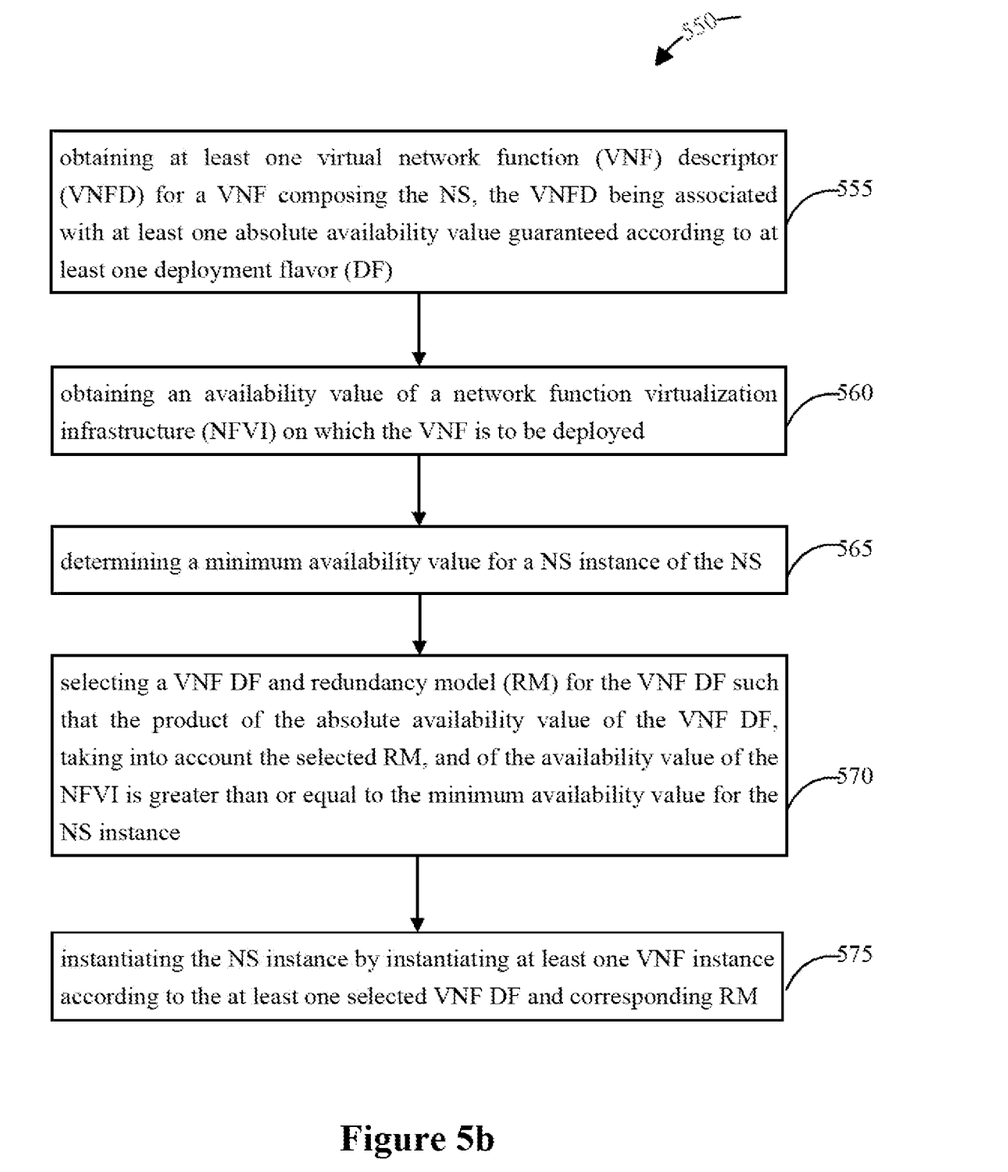

Referring to FIG. 5b, there is provided a method 550 for providing a network service (NS) satisfying a requested availability of a network slice. The method comprises obtaining, step 555, at least one virtual network function (VNF) descriptor (VNFD) for a VNF composing the NS, the VNFD being associated with at least one absolute availability value guaranteed according to at least one deployment flavor (DF); obtaining, step 560, an availability value of a network function virtualization infrastructure (NFVI) on which the VNF is to be deployed; determining, step 565, a minimum availability value for a NS instance of the NS; selecting, step 570, a VNF DF and redundancy model (RM) for the VNF DF such that the product of the absolute availability value of the VNF DF, taking into account the selected RM, and of the availability value of the NFVI is greater than or equal to the minimum availability value for the NS instance; and instantiating, step 575, the NS instance by instantiating at least one VNF instance according to the at least one selected VNF DF and corresponding RM.

In this context, absolute availability corresponds to the VNF availability considering an NFVI availability of 100%. I.e. the availability the VNF by itself can achieve when given all the resources needed. Typically, the availability of the VNF and of the NFVI are lower than 100% and the measured availability of a VNF includes and therefore is relative to the availability of the NFVI. In practice, since each NFVI may have a different availability it becomes very difficult to come up with a single VNF availability value. Therefore, using a theoretical NFVI availability of 100% eliminates this problem. In practice, there is no such NFVI availability of 100%, and VNF availability under such an assumption needs to be a calculated, for which there is currently no standard calculation methodology.

The network slice instance (NSI) may be a concatenation of one or more NS instances. The NS instance may be a composition of a plurality of VNF instances. The availability value of the NS instance may be greater than a requested availability of the NSI. An availability value of the NSI may be calculated as a product of the availability values of the plurality of NS instances in the NSI. The VNFD may comprise a plurality of DFs and information concerning an absolute availability value, $A_{VNF-DF}$ may be associated to each DF. The VNFD may comprise a plurality of DFs and information concerning which DFs of the VNF are designed to be used for VNF level redundancy may be associated to each DF. Information concerning a redundancy capability for each DF of the VNF that is designed to be used for VNF redundancy may be associated to each DF. Information concerning communication needs of redundant VNF instances may be associated to each DF. The information may be obtained from a VNF product characteristic descriptor. Alternatively, the information may be stored within the VNFD.

There is no need for VNF redundancy for a VNF DF if $$A_{VNF-DF} > \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI. There is a need for VNF redundancy for a VNF DF if $$A_{VNF-DF} \leq \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI. The M and N values for the redundancy model may be chosen to satisfy $$RM(A_{VNF-DF}) > \frac{A_{NSI}}{A_{NFVI}},$$

where N is the number of VNF instances, M is the number of redundant VNF instances, and where $RM(A_{VNF-DF})$ is the function calculating an availability value of the redundancy model used with the VNF DF based on the availability $A_{VNF-DF}$ of the VNF DF, $A_{NFVI}$ is the availability of the NFVI on which the VNF instance is to be deployed, and $A_{NSI}$ is the availability of the NSI.

Figure 6:
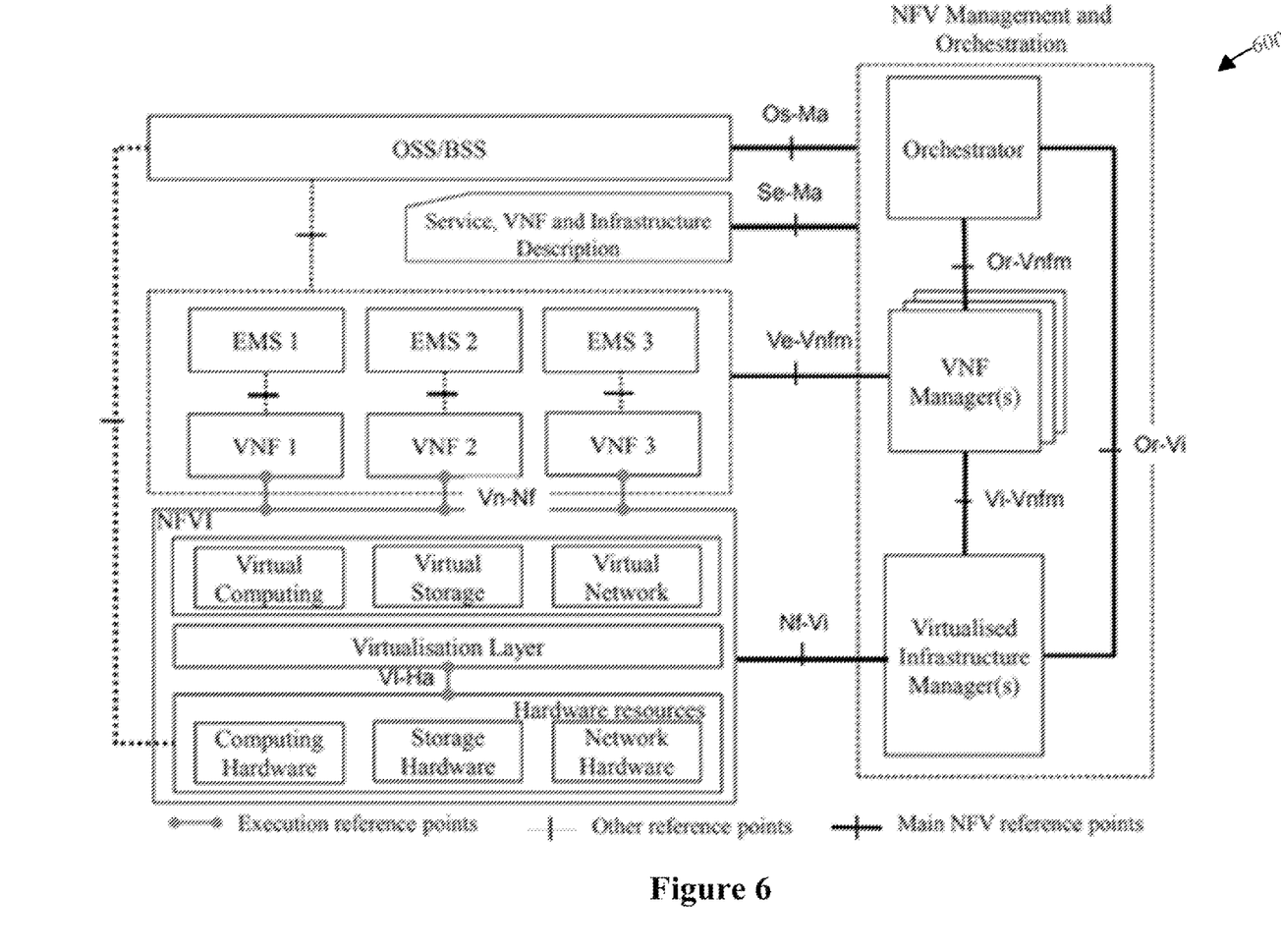
FIG. 6 is a schematic illustration of the ETSI NFV reference architectural framework with its main components.

FIG. 6 presents the ETSI NFV reference architectural framework with its main components, in which steps described herein may be executed.

Figure 7:
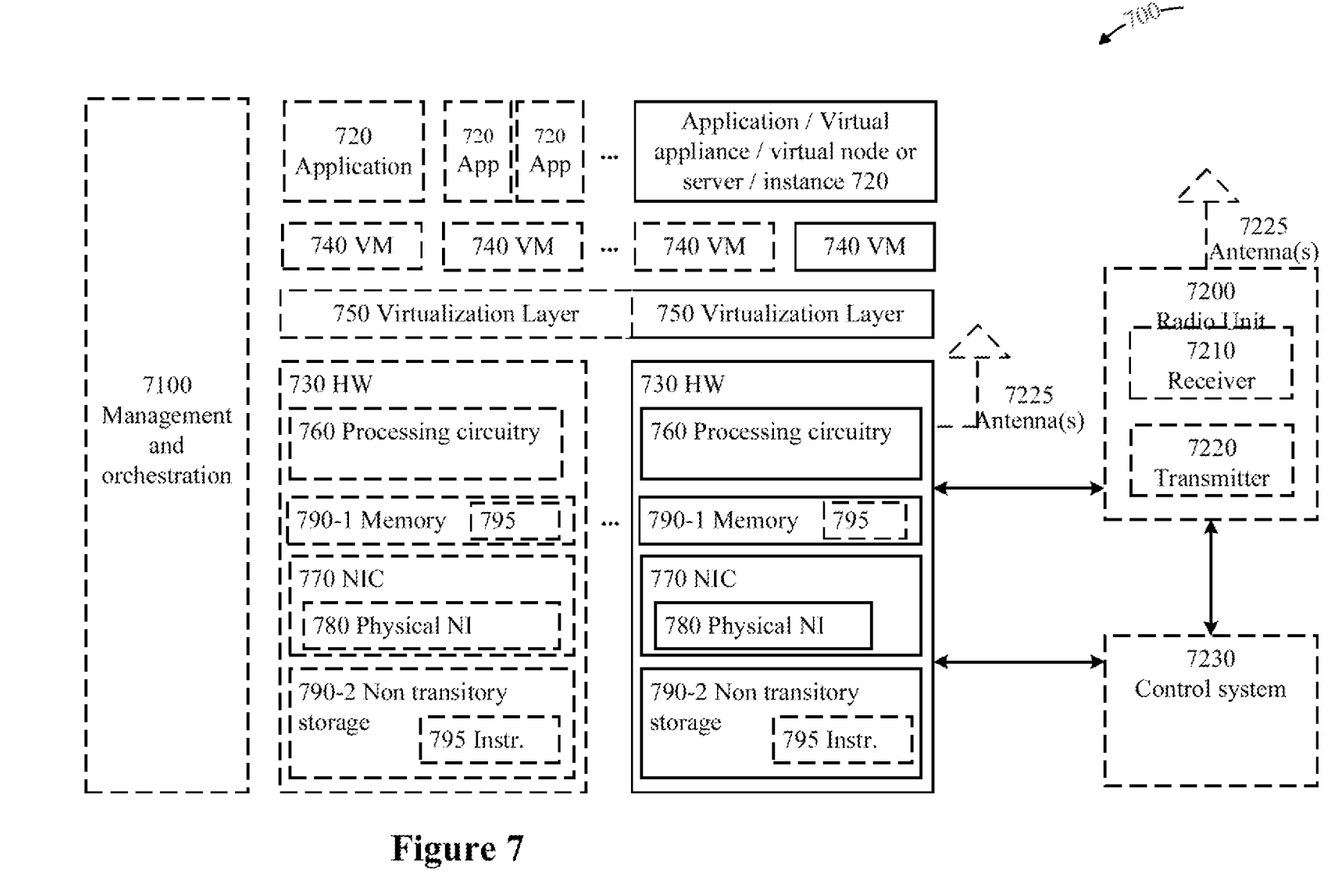
FIG. 7 is a schematic illustration of another virtualization environment.

Similar to FIG. 6, FIG. 7 is a schematic block diagram illustrating a virtualization environment 700 in which functions described herein may be implemented.

In some embodiments, some or all of the functions described herein may be implemented as virtual components executed by one or more virtual machines or containers implemented in one or more virtual environments 700 hosted by one or more of hardware nodes 730.

The functions may be implemented by one or more applications 720 (which may alternatively be called software instances, virtual appliances, network functions, virtual nodes, virtual network functions, etc.) operative to implement steps of some methods according to some embodiments. Applications 720 run in virtualization environment 700 which provides hardware 730 comprising processing circuitry 760 and memory 790. Memory 790 contains instructions 795 executable by processing circuitry 760 whereby application 720 is operative to provide any of the relevant features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by the processing circuitry 760. Each hardware devices may comprise one or more network interface controllers 770 (NICs), also known as network interface cards, which include physical network interface 780. Each hardware devices may also include non-transitory, persistent, machine readable storage media 790-2 having stored therein software 795 and/or instruction executable by processing circuitry 760. Software 795 may include any type of software including software for instantiating one or more virtualization layers 750 (also referred to as hypervisors), software to execute virtual machines 740 or containers as well as software allowing to execute functions described in relation with some embodiments described herein.

Virtual machines 740 or containers, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740 or containers, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740 or to a container.

As shown in FIG. 7, hardware 730 may be a standalone network node, with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a virtual machine 740 or container is a software implementation of a physical machine that runs programs as if they were executing on a physical, non-virtualized machine. Each of virtual machines 740 or container, and that part of the hardware 730 that executes that virtual machine, be it hardware dedicated to that virtual machine and/or hardware shared by that virtual machine with others of the virtual machines 740 or containers, forms a separate virtual network elements (VNE).

Still in the context of NFV, Virtual Network Function (VNF) is responsible for handling specific network functions that run in one or more virtual machines 740 or containers on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signaling can be effected with the use of control system 7230 which may alternatively be used for communication between the hardware nodes 730 and the radio units 7200.

There is provided a system 600, 700 for providing a network service (NS) instance satisfying a requested availability of a network slice instance (NSI) comprising processing circuits and a memory. The memory contains instructions executable by the processing circuits whereby the system is operative to obtain at least one virtual network function (VNF) descriptor (VNFD) for a VNF composing the NS, the VNFD being associated with at least one absolute availability value guaranteed according to at least one deployment flavor (DF); obtain an availability value of a network function virtualization infrastructure (NFVI) on which the VNF is to be deployed; determine a minimum availability value for a NS instance of the NS; select a VNF DF and redundancy model (RM) for the VNF DF such that the product of the absolute availability value of the VNF DF, taking into account the selected RM, and of the availability value of the NFVI is greater than or equal to the minimum availability value for the NS instance; and instantiate the NS instance by instantiating at least one VNF instance according to the at least one selected VNF DF and corresponding RM.

The network slice instance (NSI) may be a concatenation of one or more NS instances. The NS instance may be a composition of a plurality of VNF instances. The availability value of the NS instance may be greater than a requested availability of the NSI. An availability value of the NSI may be calculated as a product of the availability values of the plurality of NS instances in the NSI. The VNFD may comprise a plurality of DFs and information concerning an absolute availability value, $A_{VNF\text{-}DF}$ may be associated to each DF. The VNFD may comprise a plurality of DFs and information concerning which DFs of the VNF are designed to be used for VNF level redundancy may be associated to each DF. Information concerning a redundancy capability for each DF of the VNF that is designed to be used for VNF redundancy may be associated to each DF. Information concerning communication needs of redundant VNF instances may be associated to each DF. The information may be obtained from a VNF product characteristic descriptor. Alternatively, the information may be stored within the VNFD.

There is no need for VNF redundancy for a VNF DF if $$A_{VNF-DF} > \frac{A_{NSI}}{A_{NFVI}}$$

is satisfied, where $A_{VNF\text{-}DF}$ is the availability of the VNF DF, $A_{NFVI}$ is the availability of the NFVI on which the VNF instance is to be deployed, and $A_{NSI}$ is the availability of the NSI. There is a need for VNF redundancy for a VNF DF if $$A_{VNF-DF} \leq \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI. The M and N values for the redundancy model may be chosen to satisfy $$RM(A_{VNF-DF}) > \frac{A_{NSI}}{A_{NFVI}},$$

where N is the number of VNF instances, M is the number of redundant VNF instances, and where $RM(A_{VNF-DF})$ is the function calculating an availability value of the redundancy model used with the VNF DF based on the availability $A_{VNF-DF}$ of the VNF DF, $A_{NFVI}$ is the availability of the NFVI on which the VNF instance is to be deployed, and $A_{NSI}$ is the availability of the NSI.

There is provided a non-transitory computer readable media 790-2 having stored thereon instructions for providing a network service (NS) instance satisfying a requested availability of a network slice instance (NSI), the instructions comprising any of the steps described herein.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way.

The invention claimed is:

1. A method for providing a network service (NS) satisfying a requested availability of a network slice, comprising:
   obtaining at least one virtual network function (VNF) descriptor (VNFD) for a VNF composing the NS, the VNFD being associated with at least one absolute availability value guaranteed according to at least one deployment flavor (DF);
   obtaining an availability value of a network function virtualization infrastructure (NFVI) on which the VNF is to be deployed;
   determining a minimum availability value for a NS instance of the NS;
   selecting a VNF DF and redundancy model (RM) for the VNF DF such that the product of the absolute availability value of the VNF DF, taking into account the selected RM, and of the availability value of the NFVI is greater than or equal to the minimum availability value for the NS instance; and
   instantiating the NS instance by instantiating at least one VNF instance according to the at least one selected VNF DF and corresponding RM.

2. The method of claim 1, wherein a network slice instance (NSI) is a concatenation of one or more NS instances.

3. The method of claim 1, wherein the NS instance is a composition of a plurality of VNF instances.

4. The method of claim 2, wherein the availability value of the NS instance is greater than a requested availability of the NSI.

5. The method of claim 2, wherein an availability value of the NSI is calculated as a product of availability values of the one or more NS instances in the NSI.

6. The method of claim 1, wherein the VNFD comprises a plurality of DFs and wherein information concerning an absolute availability value, $A_{VNF-DF}$ is associated to each DF.

7. The method of claim 1, wherein the VNFD comprises a plurality of DFs and wherein information concerning which DFs of the VNF are designed to be used for VNF level redundancy is associated to each DF.

8. The method of claim 6, wherein information concerning a redundancy capability for each DF of the VNF that is designed to be used for VNF redundancy is associated to each DF.

9. The method of claim 6, wherein information concerning communication needs of redundant VNF instances is associated to each DF.

10. The method of claim 6, wherein the information is obtained from a VNF product characteristic descriptor and wherein the information is stored within the VNFD.

11. The method of claim 1, wherein there is no need for VNF redundancy for a VNF DF if is $$A_{VNF-DF} > \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

12. The method of claim 1, wherein there is a need for VNF redundancy for a VNF DF if $$A_{VNF-DF} \le \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

13. The method of claim 12, wherein an M value and an N value for the redundancy model arc chosen to satisfy $$RM(A_{VNF-DF}) > \frac{A_{NSI}}{A_{NFVI}},$$

where the N value is the number of VNF instances, the M value is the number of redundant VNF instances, and where $RM(A_{VNF-DF})$ is the function calculating an availability value of the redundancy model used with the VNF DF based on the availability $A_{VNF-DF}$ of the VNF DF, $A_{NFVI}$ is the availability of the NFVI on which the VNF instance is to be deployed, and $A_{NSI}$ is the availability of the NSI.

14. A system for providing a network service (NS) instance satisfying a requested availability of a network slice instance (NSI) comprising processing circuits and a memory, the memory containing instructions executable by the processing circuits whereby the system is operative to:
   obtain at least one virtual network function (VNF) descriptor (VNFD) for a VNF composing the NS, the VNFD being associated with at least one absolute availability value guaranteed according to at least one deployment flavor (DF);

obtain an availability value of a network function virtualization infrastructure (NFVI) on which the VNF is to be deployed;
determine a minimum availability value for a NS instance of the NS;
select a VNF DF and redundancy model (RM) for the VNF DF such that the product of the absolute availability value of the VNF DF, taking into account the selected RM, and of the availability value of the NFVI is greater than or equal to the minimum availability value for the NS instance; and
instantiate the NS instance by instantiating at least one VNF instance according to the at least one selected VNF DF and corresponding RM.

15. The system of claim 14, wherein the NSI is a concatenation of one or more NS instances.

16. The system of claim 15, wherein the availability value of the NS instance is greater than a requested availability of the NSI.

17. The system of claim 15, wherein an availability value of the NSI is calculated as a product of availability values of the one or more of NS instances in the NSI.

18. The system of claim 14, wherein the VNFD comprises a plurality of DFs and wherein information concerning an absolute availability value, $A_{VNF-DF}$ is associated to each DF.

19. The system of claim 14, wherein the VNFD comprises a plurality of DFs and wherein information concerning which DFs of the VNF are designed to be used for VNF level redundancy is associated to each DF.

20. The system of claim 19, wherein information concerning a redundancy capability for each DF of the VNF that is designed to be used for VNF redundancy is associated to each DF.

21. The system of claim 19, wherein information concerning communication needs of redundant VNF instances is associated to each DF.

22. The system of claim 18, wherein the information is obtained from a VNF product characteristic descriptor and wherein the information is stored within the VNFD.

23. The system of claim 14, wherein there is no need for VNF redundancy for a VNF DF if $$A_{VNF-DF} > \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

24. The system of claim 14, wherein there is a need for VNF redundancy for a VNF DF if $$A_{VNF-DF} \leq \frac{A_{NSI}}{A_{NFVI}}$$

is satisfied, where $A_{VNF-DF}$ is the availability of the VNF DF, $A_{NFVI}$ is the availability of the NFVI on which the VNF instance is to be deployed, and $A_{NSI}$ is the availability of the NSI.

25. The system of claim 24, wherein an M value and an N value for the redundancy model are chosen to satisfy $$RM(A_{VNF-DF}) > \frac{A_{NSI}}{A_{NFVI}},$$

where the N value is the number of VNF instances, the M value is the number of redundant VNF instances, and where $RM(A_{VNF-DF})$ is the function calculating an availability value of the redundancy model used with the VNF DF based on the availability $A_{VNF-DF}$ of the VNF DF, $A_{NFVI}$ is the availability of the NFVI on which the VNF instance is to be deployed, and $A_{NSI}$ is the availability of the NSI.

26. A non-transitory computer readable media having stored thereon instructions for providing a network service (NS) instance satisfying a requested availability of a network slice instance (NSI), the instructions comprising:
obtaining at least one virtual network function (VNF) descriptor (VNFD) for a VNF composing the NS, the VNFD being associated with at least one absolute availability value guaranteed according to at least one deployment flavor (DF);
obtaining an availability value of a network function virtualization infrastructure (NFVI) on which the VNF is to be deployed;
determining a minimum availability value for a NS instance of the NS;
selecting a VNF DF and redundancy model (RM) for the VNF DF such that the product of the absolute availability value of the VNF DF, taking into account the selected RM, and of the availability value of the NFVI is greater than or equal to the minimum availability value for the NS instance; and
instantiating the NS instance by instantiating at least one VNF instance according to the at least one selected VNF DF and corresponding RM.

* * * * *

UNITED STATES PATENT AND TRADEMARK OFFICE
CERTIFICATE OF CORRECTION

PATENT NO. : 11,711,273 B2
APPLICATION NO. : 17/266203
DATED : July 25, 2023
INVENTOR(S) : Toeroe et al.

It is certified that error appears in the above-identified patent and that said Letters Patent is hereby corrected as shown below:

In the Specification

In Column 4, Line 5, delete "($A_{Nsi}$)." and insert -- ($A_{NSi}$). --, therefor.

In Column 4, Line 7, Equation (1), delete "$A_{NSI}=A_{NS1}*A_{NS2}**A_{NSn}$" and insert -- $A_{NSI}=A_{NS1}*A_{NS2}*\ldots*A_{NSn}$ --, therefor.

In Column 4, Line 9, delete "$A_{Nsi}<1$," and insert -- $A_{NSi}<1$, --, therefor.

In Column 4, Line 31, delete "RM($A_{VNF}$) $A_{VNF}$." and insert -- RM($A_{VNF}$)≥$A_{VNF}$. --, therefor.

In Column 4, Line 37, delete "∀$A_{Nsi}$>$A_{NSI}$" and insert -- ∀$A_{NSi}$>$A_{NSI}$ --, therefor.

In Column 4, Line 37, delete "$A_{NFVIi}$>$A_{Nsi}$>$A_{NSI}$" and insert -- $A_{NFVIi}$>$A_{NSi}$>$A_{NSI}$ --, therefor.

In Column 4, Line 41, delete "$A_{NFVI}$" and insert -- $A_{NFVIi}$ --, therefor.

In Column 7, Line 12, in Equation (4), delete "$A_{NS}=A_{NFVI}*(2*A_{VNF}A_{VNF}^2)$" and insert -- $A_{NS}=A_{NFVI}*(2*A_{VNF}-A_{VNF}^2)$ --, therefor.

In Column 7, Line 60, delete "$A_{NS}=A_{NFVI}*(4*F_{VNF}A_{VNF})$" and insert -- $A_{NS}=A_{NFVI}*(4*A_{VNF}^3*F_{VNF}+A_{VNF}^4)$ --, therefor.

In Column 7, Lines 66-67, delete

"$A_{NS}=A_{NFVI}*((\binom{4}{3})A_{VNF}^3*(1-A_{VNF})^1+(\binom{4}{4})*A_{VNF}*(1-A_{VNF})^0$" and insert -- $A_{NS}=A_{NFVI}*((\binom{4}{3})*A_{VNF}^3*(1-A_{VNF})^1+(\binom{4}{4})*A_{VNF}^4*(1-A_{VNF})^0)$ --, therefor.

Signed and Sealed this
Twelfth Day of December, 2023

Katherine Kelly Vidal
*Director of the United States Patent and Trademark Office*

CERTIFICATE OF CORRECTION (continued)

In Column 8, Line 35, delete "$A_{VL}{}^a = A_{VL}{}^b = A_{VL}{}^a = A_{VL}{}^b = A_{VL}$" and insert -- $A_{VL}{}^a = A_{VL}{}^b = A_{VL}{}^c = A_{VL}{}^d = A_{VL}$ --, therefor.

In Column 8, Line 49, in Equation (6), delete

"$A_{NS_1} = A_{NFVI} * (1 - (1 - A_{VNF1} * (1 - *A_{VNF2})^2)$" and insert

-- $A_{NS_1} = A_{NFVI} * (1 - (1 - A_{VNF1} * (1 - F_{VL}{}^2) * A_{VNF2})^2)$ --, therefor.

In Column 8, Line 50, delete "VNFI$^a$ and VNFI$^b$" and insert -- VNF1$^a$ and VNF1$b$ --, therefor.

In Column 9, Line 45, delete "$A_{NSI} = A_{NFVI} * (^2 * A_{VNF1} A_{VNF1}{}^2) = 0.999890001$" and insert -- $A_{NS_1} = A_{NFVI} * (2 * A_{VNF1} - A_{VNF_1}^2) = 0.999890001$ --, therefor.

In Column 10, Lines 12-13, delete "($A_{NFv}$=0.999999)," and insert -- ($A_{NFVI}$=0.999999), --, therefor.

In Column 10, Line 24, delete "NSi" and insert -- NS$_1$ --, therefor.

In Column 10, Line 52, delete "NSi" and insert -- NS$_1$ --, therefor.

In the Claims

In Column 18, Line 21, in Claim 11, delete "if is" and insert -- if --, therefor.

In Column 18, Line 44, in Claim 13, delete "arc" and insert -- are --, therefor.